(12) United States Patent
Harbers et al.

(10) Patent No.: US 7,766,490 B2
(45) Date of Patent: Aug. 3, 2010

(54) MULTI-COLOR PRIMARY LIGHT GENERATION IN A PROJECTION SYSTEM USING LEDS

(75) Inventors: Gerard Harbers, Sunnyvale, CA (US); Serge Bierhuizen, Milpitas, CA (US)

(73) Assignees: Philips Lumileds Lighting Company, LLC, San Jose, CA (US); Koninklijke Philips Electronics N.V., Eindhoven (NL)

( * ) Notice: Subject to any disclaimer, the term of this patent is extended or adjusted under 35 U.S.C. 154(b) by 902 days.

(21) Appl. No.: 11/610,449

(22) Filed: Dec. 13, 2006

(65) Prior Publication Data

US 2008/0143970 A1 Jun. 19, 2008

(51) Int. Cl.
G03B 21/26 (2006.01)
(52) U.S. Cl. .............................. 353/94; 353/31; 353/85; 348/771
(58) Field of Classification Search .................... 353/94, 353/85, 31, 38; 349/5, 7–9; 348/771, 743; 250/553
See application file for complete search history.

(56) References Cited

U.S. PATENT DOCUMENTS

| | | | |
|---|---|---|---|
| 6,224,216 B1 | 5/2001 | Parker et al. | |
| 6,648,475 B1 | 11/2003 | Roddy et al. | |
| 2005/0190562 A1 | 9/2005 | Keuper et al. | |
| 2006/0044520 A1 | 3/2006 | Penn | |
| 2006/0132403 A1* | 6/2006 | Maximus et al. | 345/83 |
| 2006/0221305 A1 | 10/2006 | Magarill | |

* cited by examiner

*Primary Examiner*—Georgia Y Epps
*Assistant Examiner*—Jerry Brooks (57) ABSTRACT

Amber light LEDs have a higher luminance than red light LEDs. A vast majority of images displayed on television consists of colors that can be created using amber, green and blue components, with only a small percentage of red. In one embodiment of the present invention, the typically red primary light source in a projection display system is augmented with an amber light source. Green and blue primary light sources are also provided. All the light sources are high power LEDs. The particular mixture of the red and amber light is accomplished by varying the duty cycles of the red LEDs and the amber LEDs. If the RGB image to be displayed can be created using a higher percentage of amber light and a lower percentage of red light, the duty cycle of the amber LEDs is increased while the duty cycle of the red LEDs is decreased. Light/pixel modulators for creating the full color image from the three primary light sources are controlled to compensate for the variable amber/red mixture. This technique improves the efficiency of the projection system and generates less heat. A further increase in luminance can be achieved by controlling the light mixture from green and cyan LEDs as a primary light source and/or by controlling the light mixture from blue and blue-cyan LEDs as a primary light source.

26 Claims, 6 Drawing Sheets

MULTI-COLOR PRIMARY LIGHT GENERATION IN A PROJECTION SYSTEM USING LEDS

FIELD OF INVENTION

This invention relates to projection displays, such as front or rear projection televisions and, in particular, to such projection displays using light emitting diodes (LEDs) for the primary light color generation.

BACKGROUND

Video color images are typically formed using an array of small groups of red, green, and blue pixels. When the relative contributions of these three colors in an RGB pixel group are controlled, these three colors combine to create all colors in the video image. Projection display systems typically operate by illuminating one or more light modulators with very bright red, green, and blue light sources. The light source may be a very bright white light whose light is filtered to create red, green, and blue components. Such a white light source generates much heat and is inefficient since much of the light generated is other than red, green, and blue and is thus wasted. A more efficient light source consists of red, green, and blue LEDs, since no filtering is required and all the light generated is used to create the gamut of colors in the displayed image. The present application is directed to projection systems using LED light sources.

The light modulators may be small liquid crystal panels (called micro-displays) for each primary color. The red images, the green images, and the blue images are then combined by optics and projected on a screen. The projection may be a front projection or a rear projection.

Some other types of light modulators are micro-electromechanical system (MEMS) devices, such as the digital light processor (DLP™) made by Texas Instruments, where an array of micro-mirrors rapidly reflect red, green, and blue light components onto a screen. Each mirror corresponds to a pixel in the display. The angles of the mirrors determine whether the pixel is on or off, and the duty cycle determines the RGB components at each pixel location.

For large screen projection systems, the light must be very bright. To achieve such high brightness, multiple high power LEDs of each color may be used. There may be a small array of LEDs for each primary color to obtain the desired brightness.

Due to the relative efficiencies of red, green, and blue LEDs, combined with the human eye's different sensitivities to red, green, and blue light, the power used to generate the required red light component for a certain white point is much greater than the power used to create the blue light component for that white point. Since red LEDs become less efficient at higher temperatures, this relative inefficiency is exacerbated when the red LED is a high power LED that generates heat. To a lesser extent, the power used to generate the required green light component for the white point is greater than the power used to create the blue light component for that white point. However, the relative efficiencies of the red and green LEDs vary with manufacturer and, hence, green LEDs may be less efficient than red LEDs in a display in some cases.

This is a result of the following characteristics of light and LEDs. A measure of the perceived brightness to the human eye is in units called lumens. The ratio of lumens/watt is called efficacy. The human eye is much more sensitive to green light than to blue and red light. For standard red, green, and blue LEDs, assume red LEDs output around 40 lumens/watt (electrical), green LEDs output around 100 lumens/watt (electrical), and blue LEDs output around 20 lumens/watt (electrical). More efficient LEDs have a higher efficacy but the efficacy relationships between the colors generally remain the same, assuming the red, green, and blue LEDs are of the same quality. To create white light (e.g., 6500-9000 K), the relative lumen contribution is about 25% red, 70% green, and 5% blue. Blue LEDs convert electrons into emitted photons at a percentage (about 40%) that is more than double the percentage of red and green LEDs. In view of the above characteristics, to create white light from LEDs, much more power is needed for generating red light than for generating blue light. Additionally, to create white light, more power is needed for generating green light than for generating blue light.

What is needed is a technique to increase the efficiency of an LED light source in a projection display.

SUMMARY

High quality, high power amber light LEDs (e.g., 590 nm dominant wavelength) are about 2-2.5 times as efficient as high power red light LEDs (e.g., 620 nm dominant wavelength) in that, for the same amount of optical power (watts), the human eye perceives the amber light to be about 2-2.5 times brighter than the red light. In other words, the lumens/watt (optical) efficacy of amber LEDs (e.g., 490 lm/W) is about 2-2.5 greater than the lumens/watt (optical) of red LEDs (e.g., 210 lm/W (optical)).

A vast majority of images displayed on television consists of colors that can be created using amber, green and blue components, with only a small percentage of red. A high percentage of red is only needed for highly saturated red hues, which are very rare.

Accordingly, instead of the standard red, green, and blue primary colors in a projection display, the present invention uses the primary colors of amber/red mixture, green, and blue created by separate arrays of amber, red, green, and blue LEDs. For small or low brightness systems, a primary color light source may be only one high power LED. Since projection displays are typically configured to handle only three primary colors, the present invention may be implemented by combining the amber and red light together using optics and varying the amber/red mixture by controlling the duty cycle of the amber and red arrays based on the colors needed to be displayed during a color video image frame.

In one embodiment, the light from the amber and red arrays are combined into a single beam using a dichroic mirror.

Instead of amber LEDs, an array of yellow LEDs (e.g., 570-583 nm dominant wavelength) may be used instead with similar improvements in efficiency. The yellow light may be generated by a phosphor energized by a blue or UV emission of the LED active layer, or the yellow light may be directly generated by the active layer. In subsequent examples, any amber LEDs may instead be yellow LEDs or any LEDs emitting light with a wavelength longer than green.

In one embodiment, a display processor controls the duty cycle of the amber and red arrays based on the reddest pixels in the image frame. For a saturated and bright red pixel in the frame, the average light from the red array must be high during the frame period. The varying mixture of amber and red light is taken into account by the display processor when controlling the three micro-displays (small LC panels) or the micro-mirrors in a DLP projector. For even higher efficiencies, if only a few separated pixels in the image frame are highly saturated and bright red pixels, the redness of these pixels may be lessened, by adding amber light, if there will not be a noticeable effect on the picture quality. Thus, the duty cycle of the red array would not need to be high relative to the duty cycle of the amber array just because of a few pixels.

Since amber LEDs have much higher efficacy than red LEDs, the overall efficiency of the light source is greater than if the primary colors were limited to red, green, and blue.

The increase in efficiency is also a result of the following. The combination of two colors, when combined in a time sequential mode, results in higher overall luminance than simply the full luminance multiplied by the duty cycles. For example, assume an LED light source that is continuously on outputs 100% flux. If we alternately energize two LED light sources each at a 50% duty cycle, the resulting flux output for each of the LED light sources may be about 73% of its 100% flux level, depending on various factors. Therefore, the two LED light sources, each operating at a 50% duty cycle, will output a combined relative flux of 146%, resulting in an effective gain of 46% compared with a single LED light source continuously on.

This technique may also be applied to the green light. Light from a cyan array (wavelength shorter than green) and a green array of LEDs may be combined using optics and used as a primary color light source in a projection display. The combination of the two colors by adjusting their duty cycles during an image frame period results in a higher relative flux than if just the green light were used. The duty cycles of the cyan and green arrays are controlled based on the color content of the image frame. The mixtures of colors in the primary light sources are taken into account by the display processor when controlling the three micro-displays (LCDs) or the micro-mirrors in a DLP projector.

This technique may also be applied to the blue light. Light from a cyan array (wavelength longer than blue) and a blue array of LEDs may be combined using optics and used as a primary color light source in a projection display. The combination of the two colors by adjusting their duty cycles during an image frame period results in a higher relative flux than if just the blue light were used. The duty cycles of the cyan and blue arrays are controlled based on the color content of the image frame. The mixtures of colors in the primary light sources are taken into account by the display processor when controlling the three micro-displays (LCDs) or the micro-mirrors in a DLP projector.

In one embodiment, each of the three primary light sources for the RGB pixels is a combination of two different colors, the dominant wavelengths of the colors separated by at least 30 nm. For example, the primaries can be red/amber (or yellow), green/greenish-cyan, and blue/bluish-cyan.

BRIEF DESCRIPTION OF THE DRAWINGS

Elements that are similar or identical in the various figures are labeled with the same numeral.

DETAILED DESCRIPTION

The present invention may utilize LEDs of any material system, such as AlInGaP (typically for emitting red to yellow) or GaN (typically for emitting green to UV). An LED is formed on a starting growth substrate, such as sapphire, SiC, or GaAs, depending on the type of LED to be formed. Generally, an n-layer is formed followed by an active layer, followed by a p-layer. Reflective metal electrodes are then formed on the surface of the LED to contact the n and p layers. When the diode is forward biased, the active layer emits light whose wavelength is determined by the composition of the active layer. Forming such LEDs is well known and need not be described in further detail. Forming LEDs of all visible wavelengths, mounting such LEDs on a submount, and providing power to the LEDs via a PCB are described in U.S. Pat. No. 6,828,596 to Steigerwald et al. and U.S. Pat. No. 6,876,008 to Bhat et al., both assigned to the present assignee and incorporated herein by reference. LEDs using a phosphor to wavelength-convert the light emitted from the active layer may also be used.

Figure 1:
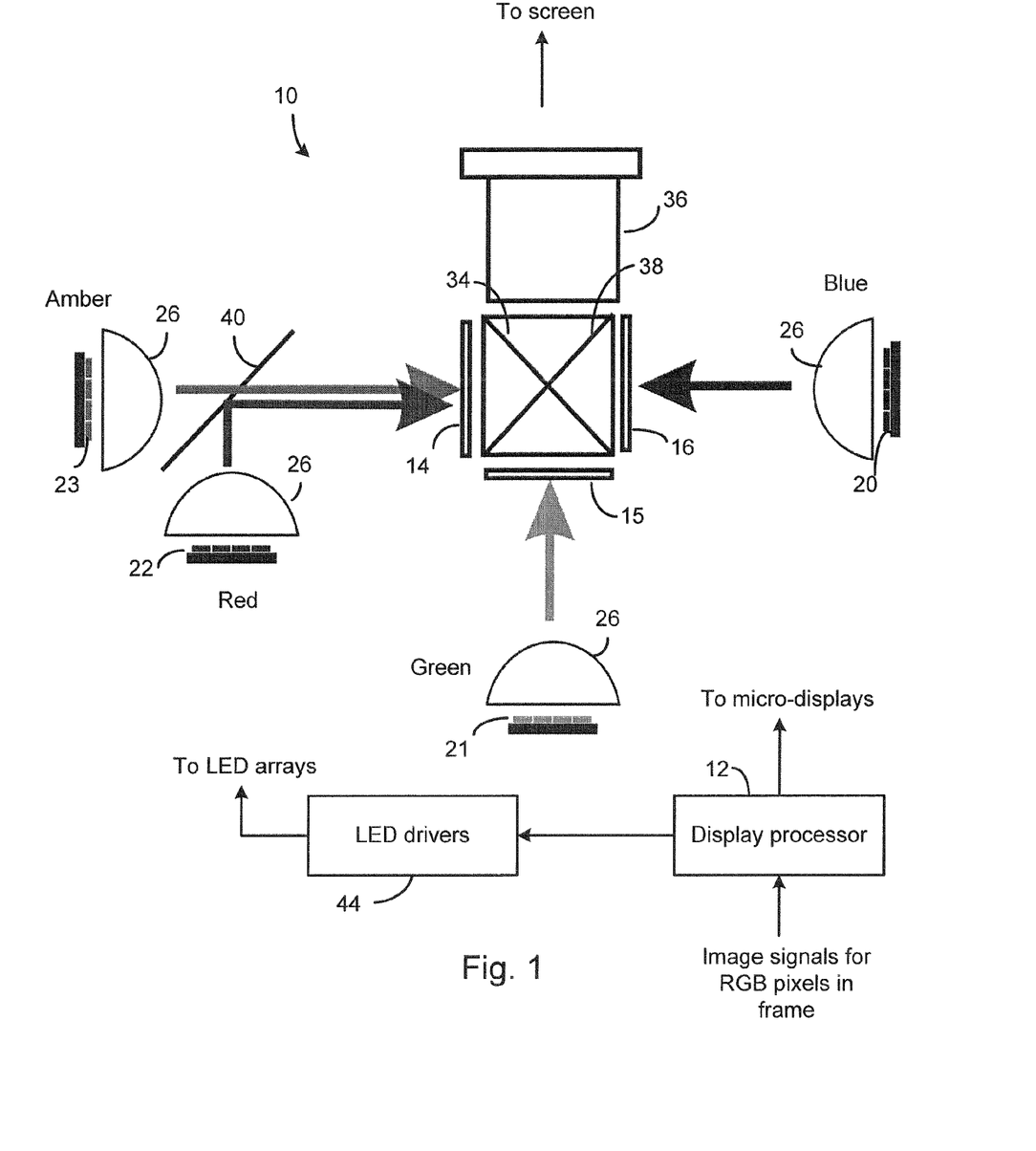
FIG. 1 is a schematic view of a projection system, in accordance with a first embodiment of the invention, using liquid crystal micro-displays, where the traditionally red primary light is instead a variable combination of amber and red light from two LED arrays.

FIG. 1 is a schematic representation of one type of projection system 10 using a separate micro-display liquid crystal panel for each primary light. The system may be a television, a projector for a computer, or any other projector of color images. Conventional image signals for controlling the brightness at each RGB pixel position on the display screen (not shown) are supplied to a display processor 12. Note that, in the context of this disclosure, the terms red pixel, green pixel, blue pixel, and RGB pixel are used to designate the pixel positions assigned to each primary light source, even though a "red pixel" may display a mixture of amber and red light. The color of any single red, green, or blue pixel may be a combination of two colors forming a primary light source. The display processor 12 controls the "shutters" in each of the micro-displays 14, 15, and 16 to control the red pixels, green pixels, and blue pixels, respectively, in the display.

Each micro-display 14-16 is essentially a small transmissive LCD, where each outputs an image in a different primary color. When the images are combined, a full color image is projected onto the screen. The layers forming each micro-display typically consist of polarizers, a liquid crystal layer, a thin film transistor array layer, and a ground plane layer. The electric fields created at each pixel location, by selectively energizing the thin film transistors at each pixel location, causes the liquid crystal layer to change the polarization of the incoming light at each pixel location. Depending on the amount of polarization at a pixel location, the pixel will pass more or less of the incoming primary light to the screen. LCDs are well known and need not be further described.

The light sources in FIG. 1 are: a blue LED array 20, a green LED array 21, a red LED array 22, and an amber LED array 23. The LEDs are mounted on submounts that sink heat from the LEDs, provide electrical connections between the LEDs, and couple the LEDs to a power source. The LEDs in an array may be connected in a combination of series and parallel. The submount has terminals that connect to a driver for that array. A lens 26 in front of each LED array collimates the light to uniformly illuminate the back surface of its associated micro-display.

Figure 2:
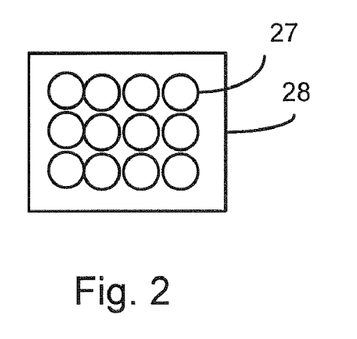
FIG. 2 is a front view of an array of LEDs of a single color used in the system of FIG. 1.

FIG. 2 is a top down view of a single array of LEDs 27 mounted on a submount 28. There may be any number of LEDs (e.g., 6-24), and the typical dimensions are on the order of a centimeter per side. The LEDs are closely spaced to create a uniform emission pattern. In a small projection system, there may be only one high power LED for each primary color.

Figure 3:
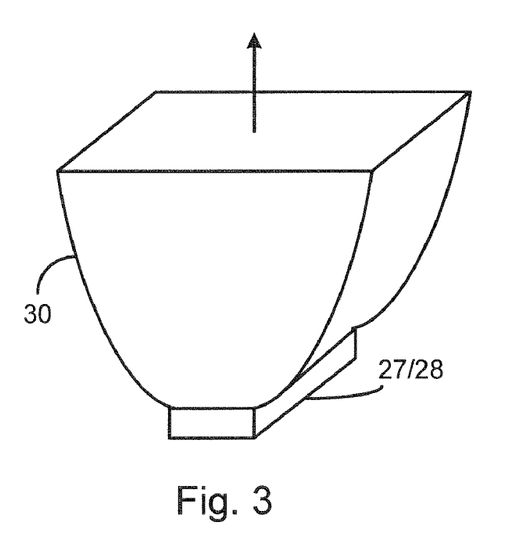
FIG. 3 illustrates a collimating reflector that may be used instead of, or in conjunction with, a lens to collimate the light from a single array of LEDs.

FIG. 3 illustrates a reflector 30, such as formed of aluminum, that may be used to create the desired illumination shape for the micro-displays. Light from an LED array 27/28 is mixed and shaped in the reflector 30 to create a rectangular pattern generally matching the shape of the micro-display.

Referring back to FIG. 1, the modulated light exiting the micro-displays 14-16 is combined to form a full color image. A dichroic mirror 34 reflects blue light but allows all other wavelengths to pass. Mirror 34 reflects the modulated blue light toward a focusing lens 36. Light exiting the lens 36 is focused onto the front of a screen (semi-reflective) or onto the rear of a screen (translucent). A second dichroic mirror 38 reflects amber and red light but allows all other wavelengths to pass. Mirror 38 reflects the modulated amber and red light toward the focusing lens 36. Both mirrors 34 and 38 allow the modulated green light to pass through to the lens 36. Each full color image RGB pixel on the screen is formed by a set of a single red pixel, a single green pixel, and a single blue pixel. The individual pixels are not perceived by the human eye at the viewing distance, and the combined light produces virtually any color.

The traditional red primary light source is augmented with an amber light source. Amber light LEDs (e.g., 590 nm) are about 2-2.5 times as efficient as red light LEDs (e.g., 615-635 nm) in that, for the same amount of optical power (watts), the human eye perceives the amber light to be about 2-2.5 times brighter than the red light. In other words, the lumens/watt efficacy of amber LEDs is about 2-2.5 greater than the lumens/watt of red LEDs. The micro-display 14 is controlled to create an image for the red pixel locations that is a combination of amber light and red light. In one embodiment, the number of amber LEDs in the array is determined based on the estimated maximum flux of amber needed for an image. The luminous flux of the amber array may be equivalent to the luminous flux of the red array but use far fewer LEDs to achieve that luminous flux, resulting in greater efficiency.

An array of LEDs that emits any wavelength between green and red, such as a yellow or an orange array, may be used instead of the amber array and still achieve improved efficiency over using only a red array of LEDs as the primary light source. A yellow array of LEDs (e.g., 570-583 nm) may use a YAG or BSSN phosphor energized by blue light to create the yellow light, or the yellow may be directly generated by the active layer.

The amber and red light are combined into a single beam using a dichroic mirror 40, which reflects red light but allows amber light to pass. By combining the light rather than treating the amber array as a separate primary light, there is no requirement to add another micro-display and accompanying optics.

The display processor 12 receives digital image signals, which specify (directly or indirectly) one of several hundred brightness states for each red, green, and blue pixel for a single image in an image frame. The image signals convey a series of still images, one per image frame. The processor 12 may actually be a chip set containing additional processors. Depending on the RGB pixel colors required for the image frame, the processor 12 determines the minimum brightness of the red LED array required during the image frame period so that, when the modulated amber/red light is mixed with the modulated green and blue light, all the colors in the image may be faithfully created. For example, a high brightness, deeply saturated red color in the image requires a relatively high brightness of the red array since the amber light could not produce colors of a wavelength longer than the wavelength of amber light. The processor is programmed to favor amber over red so that the minimum amount of pure red is used. The processor then controls the duty cycle of the amber array and red array over an image frame period to achieve the calculated mixture of amber and red light, as illustrated in FIG. 4.

To compensate for the primary light not being pure red, the processor 12 controls the shutters in the three micro-displays 14-16 accordingly so that the resulting image is not affected by using the combination of amber and red light as a primary.

Figure 4:
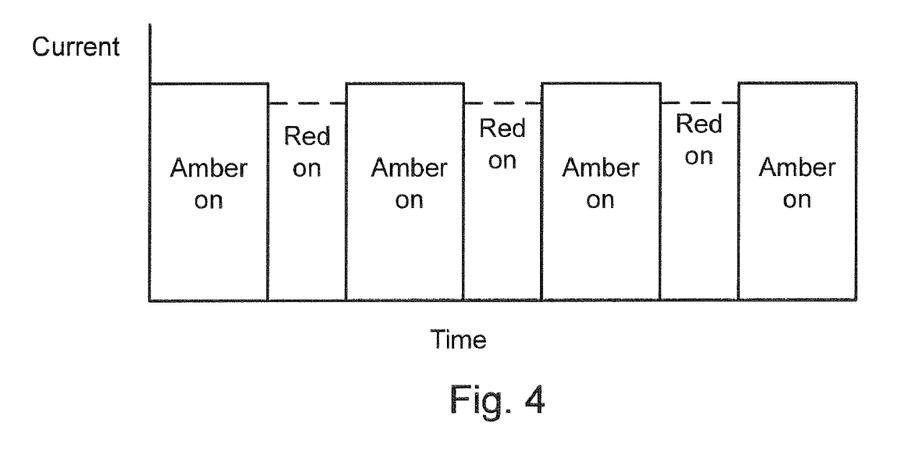
FIG. 4 illustrates the relative duty cycles of the red and amber arrays based on the color content of the image frame.

In the example shown in FIG. 4, the amber array is energized two-thirds of the frame time and the red array is energized for the remaining time. There may be one or multiple switching cycles of the arrays during a single frame period. The current to each array may be different depending on the characteristics of the LEDs and the desired brightness.

In one process, the processor 12 identifies the brightest pixel with a "red" component redder than amber. This may be used to determine the minimum duty cycle of the red array since the amber array cannot create a pixel that is redder than amber. A simple program or firmware is then used to control the duty cycle of the amber and red arrays and control the micro-displays 14-16 to compensate for the combined primary light.

To further simplify the processing, if only a few pixels are deep red, and would cause the red array to be on for a significantly longer time, such pixels may be made less bright by not changing the duty cycle of the red array just for those few pixels, assuming the difference would not be noticeable to the viewer.

FIG. 1 illustrates that the display processor 12 controls the micro-displays 14-16 as well as the LED drivers 44 (current sources) for the arrays 20-23. Normally, the current to the blue and green arrays will be constant over an image frame period.

A vast majority of images displayed on television consists of colors that can be created using amber, green and blue components, with only a small percentage of red. A high percentage of red is only needed for highly saturated red hues, which are very rare. Accordingly, the highly efficient amber array will typically be energized during every image frame, with the concomitant decrease in the duty cycle of the red array, resulting in greater efficiency of the projection system.

Figure 5:
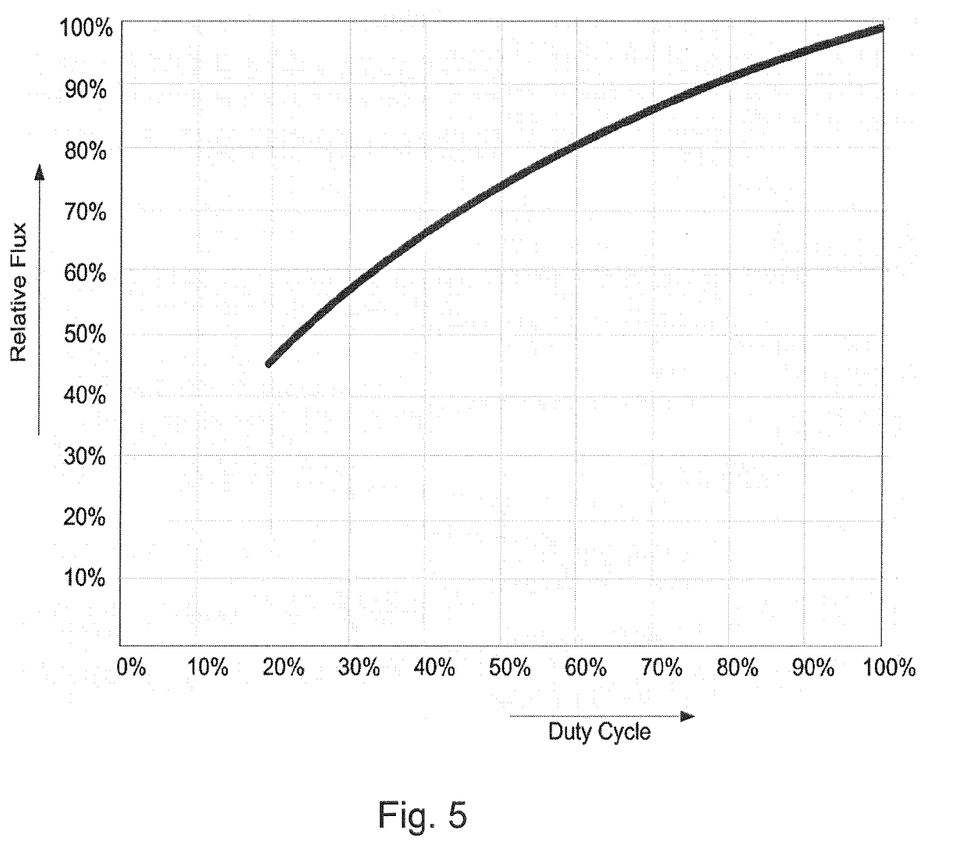
FIG. 5 is a graph showing duty cycle vs. relative flux.

FIG. 5 is a graph showing how the average flux of a typical light source is not simply the flux of the light source when continuously on multiplied by the duty cycle. The graph of FIG. 5 shows how luminance is increased by combining two light sources as a primary light source, even when the light sources are equally efficient. The combination of two colors, when combined in a time sequential mode, results in higher luminance than simply the full luminance multiplied by the duty cycles. For example, assume an LED light source that is continuously on outputs 100% flux. If we alternately energize two LED light sources each at a 50% duty cycle, the resulting flux output, shown in FIG. 5, for each of the LED light sources is about 73% of its 100% flux level. Therefore, the two LED light sources, each operating at a 50% duty cycle, will output a combined relative flux of 146%, resulting in an effective gain of 46% compared with a single LED light source continuously on.

Figure 6:
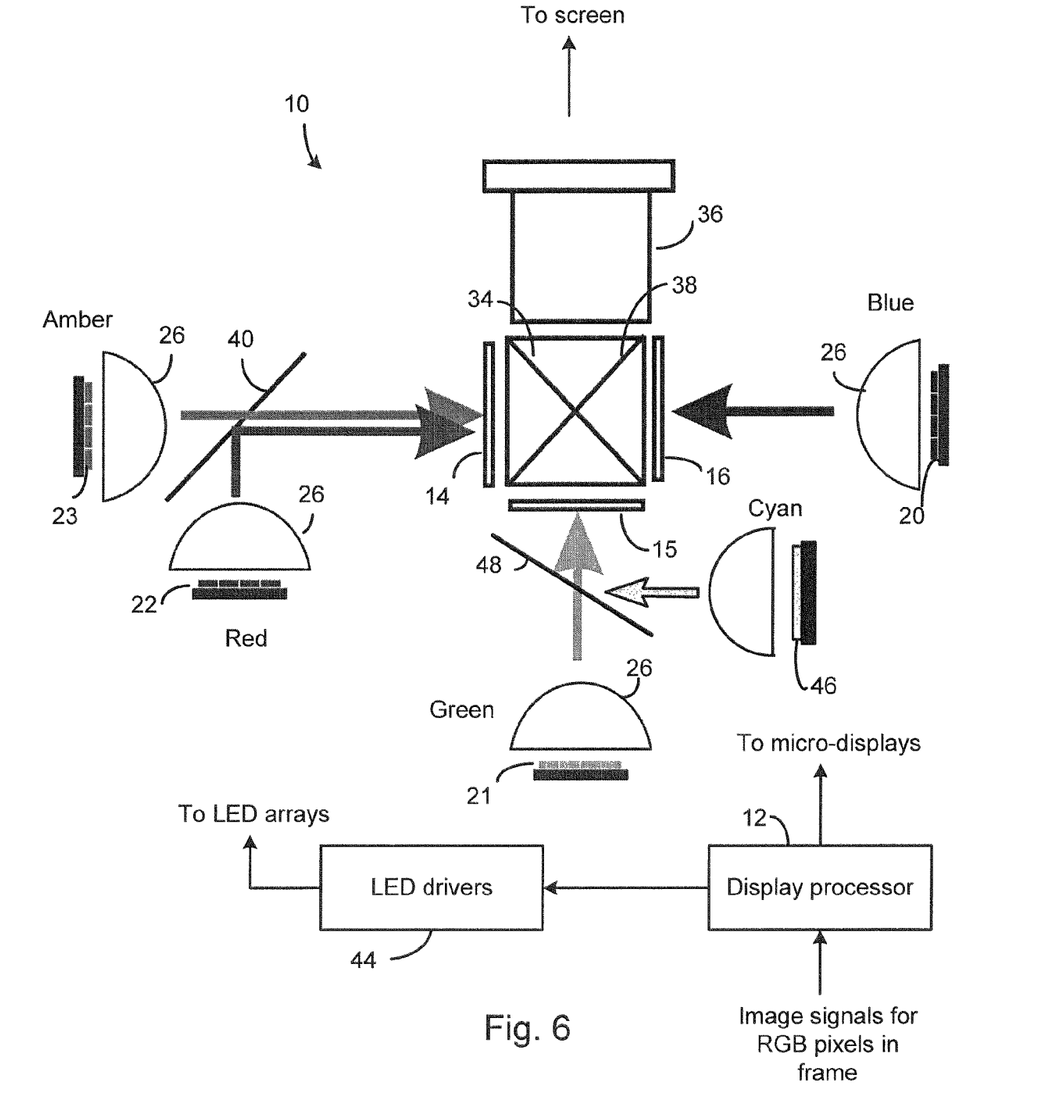
FIG. 6 is a schematic view of a projection system similar to FIG. 1 but where the traditionally green primary light is instead a variable combination of cyan and green light from two LED arrays.

In view of the graph of FIG. 5, even greater luminance can be achieved by providing a combined primary light from a green array of LEDs and a blue-green (or cyan) array of LEDs, as shown in FIG. 6. In FIG. 6 a cyan array 46 of LEDs is energized during a portion of the frame period based on the colors in the image. A dichroic mirror 48 reflects cyan light but allows green light to pass. The relative duty cycles of the green and cyan arrays are determined by the processor 12 and may be based on the hue of the greenest pixel and its brightness, since cyan cannot be used in generating a color greener than cyan. The processor 12 controls the duty cycle and the micro-displays 14-16 using the same techniques discussed above for the red pixels.

In another embodiment, instead of the processor controlling the micro-displays based on the combined amber/red light or cyan/green light, the micro-displays may be rapidly controlled in synchronization with the controlling of the duty cycle of the amber and red arrays or the cyan and green arrays. This process is more complex than treating the primary light as a combination of amber and red, or cyan and green, during the entire image frame.

The green or cyan LEDs may be formed so that the material in the active layer directly generates the green or cyan light. In another embodiment, the green or cyan LEDs are formed of blue or UV LEDs coated with a phosphor, or which use a phosphor plate, that emits green or cyan light when energized by the blue or UV light. The phosphor layer may allow some of the blue light to leak through the phosphor to create green or cyan light.

Further, in view of the graph of FIG. 5, even greater luminance can be achieved by providing a combined primary light from a blue array of LEDs and a blue-green (or cyan) array of LEDs. If both the green primary light and the blue primary light are combinations of two light sources, the green array would be combined with a greenish-cyan array and the blue array would be combined with a bluish-cyan array. Combining the light in the blue primary would be similar to the operation of the red and green primaries described above (e.g., using a dichroic mirror, adjusting duty cycles, etc.).

In one embodiment, the lenses 26 in FIGS. 1 and 6 are separated from the LEDs so that there is an air gap. This may be useful for cooling the LEDs and for coupling more light into the focusing lens 36. Additionally, the lenses may form part of an existing projection system, and it is desirable to only change the minimum amount of hardware in the system to convert it from a 3-color system to a four or five color system. Further, since the LEDs generate a lot of heat, it may be desirable to form the lens out of glass, which is not a good material for encapsulating LEDs.

Figure 7:
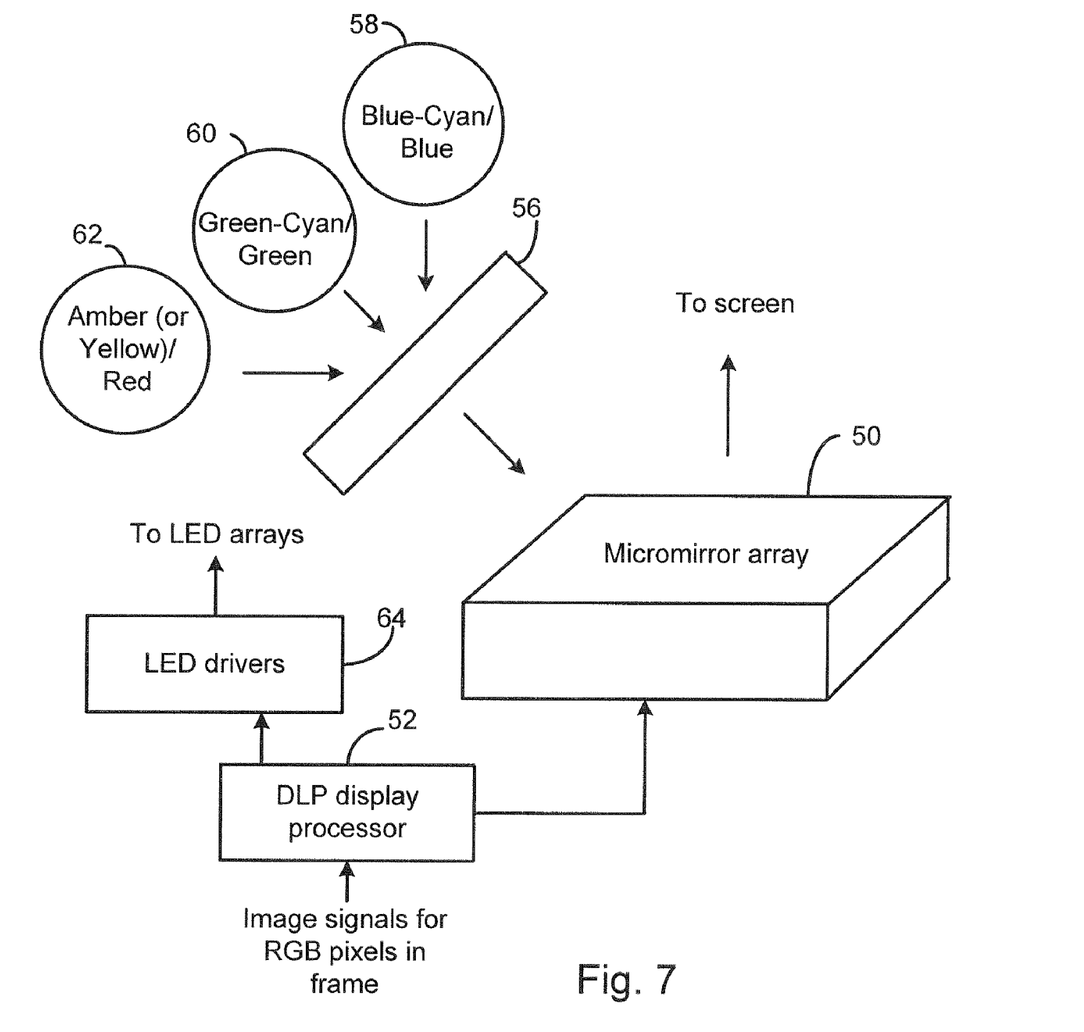
FIG. 7 illustrates the invention being applied to a DLP projection system, where each of the primary light sources is a mixture of light from two different colors whose duty cycles are controlled based on the colors in the images to be displayed.

The concepts of the present invention can be applied to any type of projection system. FIG. 7 shows a DLP projection system using a DLP micro-mirror array 50 and chip set from Texas Instruments. The available DLP technology literature is incorporated herein by reference. Digital image signals are processed by the display processor 52 for controlling the angles of over one million hinged mirrors in the array 50. The image frame is divided into three periods, one period for each primary color component of the image. During each period, only one primary color light source is energized. In another embodiment, shutters for the light sources are used. A lens 56 collimates the illuminating primary color light and applies it to the micro-mirrors. Each micro-mirror corresponds to a single RGB pixel in the image. One angle of the mirror effectively blocks the light to that pixel position on the display screen, while a second angle fully reflects the light to that pixel location. By rapidly switching the angles at a certain duty cycle, a percentage of the full brightness of that primary color is applied to the pixel. After the three periods, the combined RGB images form a full color image. The rapid switching of the mirrors and the primary color light sources is not perceived by the viewer.

In FIG. 7, the primary color sources are: 1) a blue array of LEDs and a bluish-cyan array of LEDs 58 whose light is combined into a single primary color light; 2) a green array of LEDs and a greenish-cyan array of LEDs 60 whose light is combined into a single primary color light; and 3) a red array of LEDs and an amber (or yellow) array of LEDs 62 whose light is combined into a single primary color light. Each array may be similar to that shown in FIG. 2 and may instead even be one LED.

The control of the LED arrays in FIG. 7 is similar to the control of the arrays in FIGS. 1 and 6. The processor 52 identifies the redder pixels in the image and adjusts the duty cycle of the red and amber arrays by drivers 64 to maximize efficiency. The processor 52 then compensates for the mixture of amber and red light by suitably changing the duty cycles of the micro-mirrors.

Similarly, the processor 52 identifies the greener pixels in the image and adjusts the duty cycle of the green and green-cyan arrays by drivers 64 to maximize efficiency. The processor 52 then compensates for the mixture of green and green-cyan light by suitably changing the duty cycles of the micro-mirrors.

Similarly, the processor 52 identifies the bluer pixels in the image and adjusts the duty cycle of the blue and blue-cyan arrays by drivers 64 to maximize efficiency. The processor 52 then compensates for the mixture of blue and blue-cyan light by suitably changing the duty cycles of the micro-mirrors.

In one embodiment, instead of each different color of LED being in a separate array, two different color LEDs are interspersed in a single array on a submount, where one color of LEDs can be controlled separately from the other color of LEDs. Interspersing the different color LEDs provides mixing of the light. In this way, no combining optics are needed, and the light source is smaller and more easily adaptable to existing projection system designs.

Figure 8:
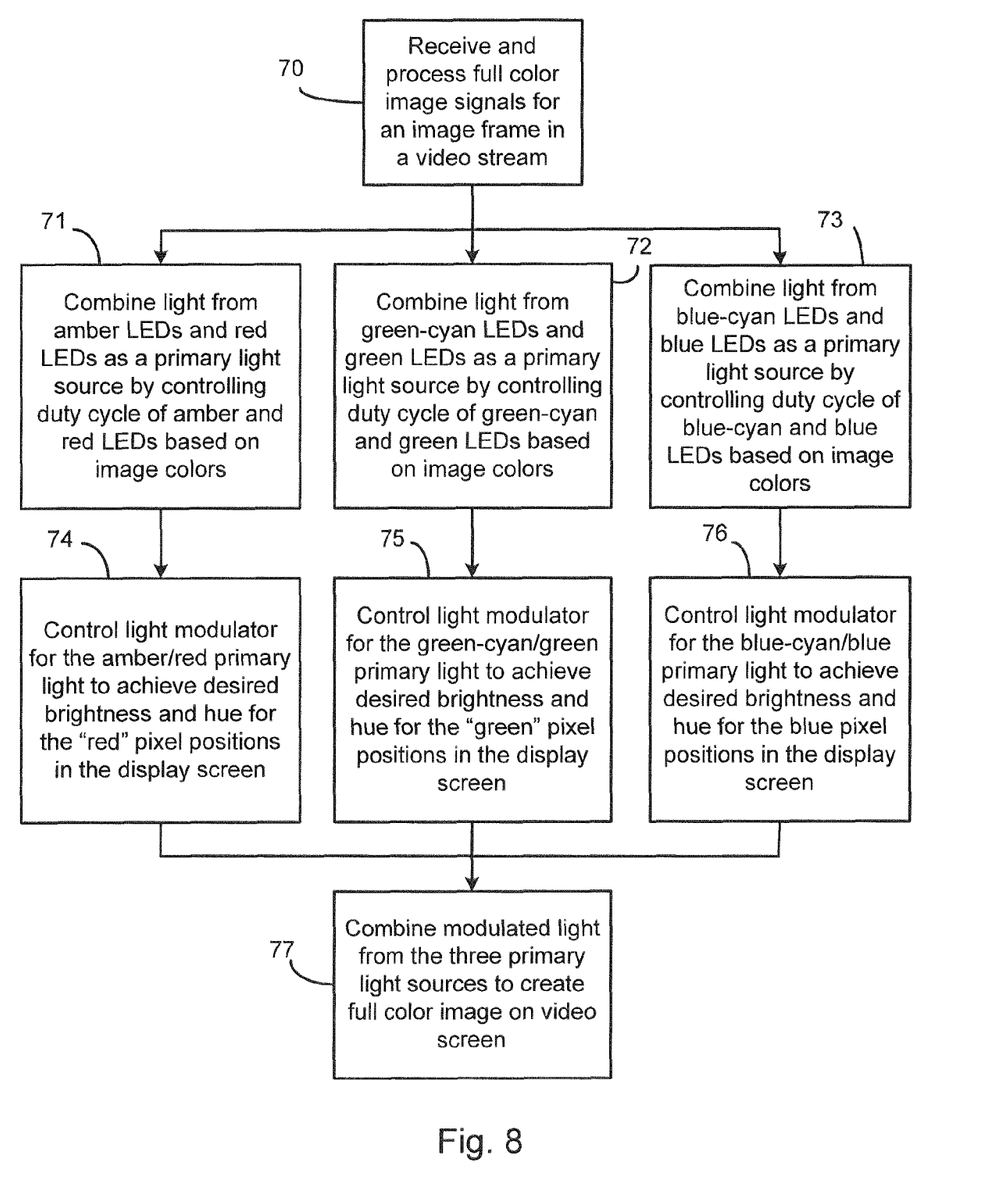
FIG. 8 is a flowchart with various steps performed by a projection system in accordance with an embodiment of the invention.

FIG. 8 is a flowchart summarizing various steps performed by a projection system in accordance with one embodiment of the invention. The process applies to systems using a micro-display for each primary light source or using DLP.

In step 70, conventional image signals containing information for constructing a full color image using red, green, and blue pixel positions on a display screen are applied to a processor.

In step 71, light from an amber array of LEDs and a red array of LEDs is combined into a single primary light beam for the red pixel locations in the display. The optimum mixture of light for maximizing efficiency of the primary light source is based on the image colors to be displayed. The duty cycles of the amber and red LEDs are controlled to provide the desired mixture.

In step 72, light from a greenish-cyan array of LEDs and a green array of LEDs is combined into a single primary light beam for the green pixel locations in the display. The optimum mixture of light for maximizing efficiency of the primary light source is based on the image colors to be displayed. The duty cycles of the greenish-cyan and green LEDs are controlled to provide the desired mixture.

In step 73, light from a bluish-cyan array of LEDs and a blue array of LEDs is combined into a single primary light beam for the blue pixel locations in the display. The optimum mixture of light for maximizing efficiency of the primary light source is based on the image colors to be displayed. The duty cycles of the bluish-cyan and blue LEDs are controlled to provide the desired mixture.

In step 74, a light modulator (e.g., micro-mirrors or microdisplay) modulates the combined amber/red light for each red pixel location in the display to create the image. The modulation is adjusted for the particular duty cycles of the amber and red LEDs and for the particular duty cycles of the other primary light sources.

In step 75, a light modulator modulates the combined green-cyan/green light for each green pixel location in the display to create the image. The modulation is adjusted for the particular duty cycles of the green-cyan and green LEDs and for the particular duty cycles of the other primary light sources.

In step 76, a light modulator modulates the combined blue-cyan/blue light for each blue pixel location in the display to create the image. The modulation is adjusted for the particular duty cycles of the blue-cyan and blue LEDs and for the particular duty cycles of the other primary light sources.

In step 77, the modulated light from the three primary light sources is combined to create a full color image. In a DLP system, no additional combining optics is needed since the light is already combined by being modulated by a single array of micro-mirrors.

In one embodiment, each of the three primary light sources for the RGB pixels is a combination of two different colors, the dominant wavelengths of the colors separated by at least 30 nm. An LED of a particular color in the context of this disclosure is one that directly emits that particular color or emits that particular color using energized phosphor.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A projection system for displaying a full color image using only three primary light sources, the system comprising:

three light modulators, a first light modulator for modulating light from a first primary light source, a second light modulator for modulating light from a second primary light source, and a third light modulator for modulating light from a third primary light source, each of the light modulators being controlled by at least one processor to simultaneously provide modulated light at primary light pixel locations in a display, there being no additional primary light sources;

the first primary light source comprising at least one red light emitting diode (LED) and at least one non-red LED that emits light at a wavelength shorter than red and longer than green, light from the at least one red LED and light from the at least one non-red LED being combined into a single beam;

the second primary light source comprising at least one green LED;

the third primary light source comprising at least one blue LED;

at least one driver for energizing the at least one red LED, the at least one non-red LED, the at least one green LED, and the at least one blue LED;

the at least one processor adapted to receive image signals and, in response, control the three light modulators to create a projected image, and control the at least one driver to vary relative brightness levels of the at least one red LED and the at least one non-red LED over a period of time to change a light mixture emitted from the first primary light source, wherein the at least one processor is adapted to dynamically vary the mixture is based on colors in a particular image to be displayed, wherein the at least one processor is adapted to cause the first primary light source to have an increased color component from the at least one red LED when an image to be displayed requires a red component unable to be provided by the at least one non-red LED, and wherein the at least one processor is adapted to cause the first primary light source to have a decreased color component from the at least one red LED when an image to be displayed does not require a red component produced by the at least one red LED, wherein the at least one processor controls the second light modulator to modulate light from the second primary light source and controls the third light modulator to modulate light from the primary light source to compensate for changes in the light mixture emitted from the first primary light source.

2. The system of claim 1 wherein the at least one non-red LED comprises at least one amber LED.

3. The system of claim 1 wherein the at least one non-red LED comprises at least one yellow LED.

4. The system of claim 1 wherein the at least one processor controls the at least one driver to vary duty cycles of the at least one red LED and the at least one non-red LED.

5. The system of claim 1 wherein the image signals define a series of still images, each image being conveyed in an image frame, wherein the at least one processor controls the at least one driver to vary duty cycles of the at least one red LED and the at least one non-red LED based on an image in a single image frame.

6. The system of claim 1 wherein the image signals define a series of still images, each image being conveyed in an image frame, and wherein the at least one processor controls the at least one driver to vary duty cycles of the at least one red LED and the at least one non-red LED, wherein the duty cycle of the at least one red LED and the duty cycle of the at least one non-red LED add up to approximately 100% for a single image frame.

7. The system of claim 1 wherein each of the three light modulators comprises a liquid crystal panel with controllable pixel locations.

8. The system of claim 1 wherein the light modulators comprises an array of controllable micro-mirrors.

9. The system of claim 1 wherein the second primary light source comprises at least one green light emitting diode (LED) and at least one non-green LED that emits light at a wavelength shorter than green and longer than blue, light from the at least one green light emitting diode (LED) and light from the at least one non-green LED being combined into a single beam, and wherein the at least one processor is adapted to control the at least one driver to vary relative brightness levels of the at least one green LED and the at least one non-green LED over a period of time to change a light mixture emitted from the second primary light source, wherein the mixture is based on colors in a particular image to be displayed.

10. The system of claim 1 wherein the third primary light source comprises at least one blue light emitting diode (LED) and at least one non-blue LED that emits light at a wavelength longer than blue and shorter than green, light from the at least one blue light emitting diode (LED) and light from the at least one non-blue LED being combined into a single beam, and wherein the at least one processor is adapted to control the at least one driver to vary relative brightness levels of the at least one blue LED and the at least one non-blue LED over a period of time to change a light mixture emitted from the third primary light source, wherein the mixture is based on colors in a particular image to be displayed.

11. The system of claim 1 wherein the at least one red LED comprises an array of red LEDs, and the at least one non-red LED comprises a separate array of non-red LEDs.

12. The system of claim 1 wherein the at least one red LED and the at least one non-red LED comprise a single array of interspersed red and non-red LEDs.

13. A method of operating a projection system for displaying a full color image using only three primary color light sources, the method comprising:
- modulating, light from a first primary light source by a first light modulator to provide modulated light at pixel locations in a display;
- modulating light from a second primary light source by a second light modulator to provide modulated light at pixel locations in the display;
- modulating light from a third primary light source by a third light modulator to provide modulated light at pixel locations in a the display;
- combining the modulated light from the first primary light source, the second primary light source, and the third primary light source to simultaneously provide the modulated light at pixel locations in the display;
- the first primary light source comprising at least one red light emitting diode (LED) and at least one non-red LED that emits light at a wavelength shorter than red and longer than green, light from the at least one red LED and light from the at least one non-red LED being combined into a single beam,
- the second primary light source comprising at least one green LED,
- the third primary light source comprising at least one blue LED;
- energizing, by at least one driver, the at least one red LED, the at least one non-red LED, the at least one green LED, and the at least one blue LED;
- receiving image signals and, in response, controlling the first light modulator, the second light modulator, and the third light modulator to create a projected image, and controlling the at least one driver to vary relative brightness levels of the at least one red LED and the at least one non-red LED over a period of time to change a light mixture emitted from the first primary light source, wherein the mixture is dynamically varied based on colors in a particular image to be displayed, wherein the first primary light source is controlled by the at least one driver to have an increased color component from the at least one red LED when an image to be displayed requires a red component unable to be provided by the at least one non-red LED, and wherein the first primary light source is controlled to have a decreased color component from the at least one red LED when an image to be displayed does not require a red component produced by the at least one red LED,
- wherein the second light modulator modulates light from the from the second primary light and wherein the third light modulator modulates light from the third primary light source to compensate for changes in the light mixture emitted from the first primary light source.

14. The method of claim 13 wherein the image signals define a series of still images, each image being conveyed in an image frame, wherein controlling the at least one driver comprises controlling the at least one driver to vary duty cycles of the at least one red LED and the at least one non-red LED, wherein the duty cycle of the at least one red LED and the duty cycle of the at least one non-red LED add up to approximately 100% for a single image frame.

15. The method of claim 13 wherein the at least one non-red LED comprises at least one amber LED.

16. The method of claim 13 wherein the at least one non-red LED comprises at least one yellow LED.

17. The method of claim 13 wherein the at least one red LED comprises an array of red LEDs, and the at least one non-red LED comprises a separate array of non-red LEDs.

18. The method of claim 13 wherein the at least one red LED and the at least one non-red LED comprise a single array of interspersed red and non-red LEDs.

19. A projection system for displaying a full color image using only three primary color light sources, the system comprising:
- three light modulators, a first light modulator for modulating light from a first primary light source, a second light modulator for modulating light from a second primary light source, and a third light modulator for modulating light from a third primary light source, each of the light modulators being controlled by at least one processor to simultaneously provide modulated light at primary light pixel locations in a display, there being no additional primary light sources;
- the first primary light source comprising at least one red light emitting diode (LED);
- the second primary light source comprising at least one green LED and at least one non-green LED that emits light at a wavelength shorter than green and longer than blue, light from the at least one green LED and light from the at least one non-green LED being combined into a single beam;
- the third primary light source comprising at least one blue LED;
- at least one driver for energizing the at least one red LED, the at least one green LED, the at least one non-green LED, and the at least one blue LED;
- at least one processor adapted to receive image signals and, in response, control the three light modulators to create a projected image, and control the at least one driver to vary relative brightness levels of the at least one green LED and the at least one non-green LED over a period of time to change a light mixture emitted from the second primary light source, wherein the at least one processor is adapted to dynamically vary the mixture is based on colors in a particular image to be displayed, wherein the at least one processor is adapted to cause the second primary light source to have an increased color component from the at least one green LED when an image to be displayed requires a green component unable to be provided by the at least one non-green LED, and wherein the at least one processor is adapted to cause the second primary light source to have a decreased color component from the at least one green LED when an image to be displayed does not require a green component produced by the at least one green LED,
- wherein the at least one processor control the first light modulator to modulate light from the first primary light source and controls the third light modulator to modulate light from the third primary light source to compensate for changes in the light mixture emitted from the second primary light source.

20. The system of claim 19 wherein the image signals define a series of still images, each image being conveyed in an image frame, and wherein the at least one processor controls the at least one driver to vary duty cycles of the at least one green LED and the at least one non-green LED, wherein the duty cycle of the at least one green LED and the duty cycle of the at least one non-green LED add up to approximately 100% for a single image frame.

21. The system of claim 19 wherein the at least one green LED comprises an array of green LEDs, and the at least one non-green LED comprises a separate array of non-green LEDs.

22. The system of claim 19 wherein the at least one green LED and the at least one non-green LED comprise a single array of interspersed green and non-green LEDs.

23. A projection system for displaying a full color image using three primary color light sources, the system comprising:
   three light modulators, a first light modulator for modulating light from a first primary light source, a second light modulator for modulating light from a second primary light source, and a third light modulator for modulating light from a third primary light source, each of the light modulators being controlled by at least one processor to simultaneously provide modulated light at primary light pixel locations in a display, there being no additional primary light sources;
   the first primary light source comprising at least one red light emitting diode (LED);
   the second primary light source comprising at least one green LED;
   the third primary light source comprising at least one blue LED and at least one non-blue LED that emits light at a wavelength shorter than green and longer than blue, light from the at least one blue LED and light from the at least one non-blue LED being combined into a single beam;
   at least one driver for energizing the at least one red LED, the at least one green LED, the at least one non-blue LED, and the at least one blue LED;
   at least one processor adapted to receive image signals and, in response, control the three light modulators to create a projected image, and control the at least one driver to vary relative brightness levels of the at least one blue LED and the at least one non-blue LED over a period of time to change a light mixture emitted from the third primary light source, wherein the at least one processor is adapted to dynamically vary the mixture is based on colors in a particular image to be displayed, wherein the at least one processor is adapted to cause the third primary light source to have an increased color component from the at least one blue LED when an image to be displayed requires a blue component unable to be provided by the at least one non-blue LED, and wherein the at least one processor is adapted to cause the third primary light source to have a decreased color component from the at least one blue LED when an image to be displayed does not require a blue component produced by the at least one blue LED,
   wherein the at least one processor controls the first light modulator to modulate light from the first primary light source and controls the third light modulator to modulate light from the third primary light source to compensate for changes in the light mixture emitted from the second primary light source.

24. The system of claim 23 wherein the image signals define a series of still images, each image being conveyed in an image frame, and wherein the at least one processor controls the at least one driver to vary duty cycles of the at least one blue LED and the at least one non-blue LED, wherein the duty cycle of the at least one blue LED and the duty cycle of the at least one non-blue LED add up to approximately 100% for a single image frame.

25. The system of claim 23 wherein the at least one blue LED comprises an array of blue LEDs, and the at least one non-blue LED comprises a separate array of non-blue LEDs.

26. The system of claim 23 wherein the at least one blue LED and the at least one non-blue LED comprise a single array of interspersed blue and non-blue LEDs.

* * * * *